United States Patent [19]

Robertson

[11] 4,079,989
[45] Mar. 21, 1978

[54] PICKUP BED TOPPER
[75] Inventor: Robert H. Robertson, Dallas, Tex.
[73] Assignee: Ronbil Industries, Inc., Mesquite, Tex.
[21] Appl. No.: 619,900
[22] Filed: Oct. 6, 1975

Related U.S. Application Data
[63] Continuation-in-part of Ser. No. 545,086, Jan. 29, 1975, Pat. No. 3,950,010.
[51] Int. Cl.² .............................................. B60J 7/10
[52] U.S. Cl. ................................. 296/100; 280/179 R; 296/3; 296/137 B
[58] Field of Search ............... 296/137 R, 137 B, 100, 296/10, 3, 13, 14; 280/179 R

[56] References Cited
U.S. PATENT DOCUMENTS

| | | | |
|---|---|---|---|
| 3,489,456 | 1/1970 | Klanke | 296/100 |
| 3,704,039 | 11/1972 | Dean | 296/137 B |
| 3,713,687 | 1/1973 | Hooks et al. | 296/137 B |
| 3,765,713 | 10/1973 | Suitt | 296/3 |
| 3,785,698 | 1/1974 | Dean et al. | 296/137 B |
| 3,840,250 | 10/1974 | Bott | 280/179 R |
| 3,841,690 | 10/1974 | Piercy | 296/10 |

Primary Examiner—Philip Goodman
Assistant Examiner—Michael J. Forman
Attorney, Agent, or Firm—Richards, Harris & Medlock

[57] ABSTRACT

A topper for the bed of a pickup truck comprises a U-shaped frame including side members positioned to extend along the tops of the side walls and a front member positioned to extend along the top of the front wall of the pickup bed. Retaining members are received in the stake holes of the side walls of the pickup bed to secure the frame thereto. A cover is pivotally supported on the front member of the frame and extends continuously the full length and width of the pickup bed. The side and front members of the frame comprise hollow rectangular tubular cross sections with the side members functioning to wholly enclose the retaining members. Each retaining member includes a cross-shaped bolt, the side arms of which are rotatably positioned and then drawn upwardly into engagement with the underside of the tops of the side walls of the pickup bed. In an alternative embodiment, a plurality of ladder support members extend upwardly from the frame to support an upper ladder receiving structure, and the cover is pivotally supported within the upwardly extending members.

9 Claims, 11 Drawing Figures

PICKUP BED TOPPER

CROSS REFERENCE TO RELATED APPLICATION

This application is a continuation-in-part of co-pending application Ser. No. 545,086, filed Jan. 29th, 1975, for TIE-DOWN CLAMP ASSEMBLY FOR TRUCK VEHICLE BED, now U.S. Pat. No. 3,950,010.

BACKGROUND AND SUMMARY OF THE INVENTION

This invention relates to toppers for pickup beds, and more particularly to an arrangement for securing a topper to a pickup bed utilizing the stake holes in the side walls of the bed.

As is well known, pickup trucks have achieved widespread acceptance not only for industrial, construction and agricultural purposes, but also for recreational use and general transportation. In many instances it is found desirable to provide the bed of the pickup truck with a topper, which is a rigid cover member extending continuously across the entire length and the entire width of the pickup truck bed. Thus, the topper serves to cover, protect and secure the contents of the pickup truck bed. The topper also substantially changes the airflow characteristics relative to the vehicle, and in this way provides a substantial increase in fuel economy.

At the present time a topper is typically mounted on a pickup truck bed utilizing hinges which are secured to the front wall of the pickup truck bed by means of threaded fasteners, or the like. This is unsatisfactory from a number of standpoints. First, difficulties encountered in locating the proper positioning for the fasteners, forming the necessary pilot holes, and installing the fasteners and thereby securing the topper to the pickup truck bed. Second, the topper is not readily removed, and even after it is removed, unsightly holes remain in the front wall of the pickup bed. Third, problems such as rust, water entry and the like are often encountered as a result of forming the fastener receiving holes.

The present invention relates to a topper for pickup truck beds which overcomes the foregoing and other problems that have long since characterized the prior art. In accordance with the broader aspects of the invention, the cover member of the topper is pivotally supported on a U-shaped frame, and the U-shaped frame is secured to the side walls of the pickup truck bed utilizing the stake holes provided therein. Thus, the topper is mounted on the pickup truck bed without using threaded fasteners and without forming fastener receiving holes. In this manner the topper is readily installed on and is subsequently readily removed from the pickup truck bed. Moreover, the installation of the topper is accomplished without the necessity of forming fastener receiving holes and without encountering the problems associated therewith.

In accordance with more specific aspects of the invention, the frame is U-shaped, and includes side members which extend along the tops of the side walls of the pickup truck bed and a front member which extends along the top of the front wall of the bed. The cover member is hingedly secured to the front member of the frame, preferably by means of a piano type hinge. Retaining members are secured to the side members of the frame and extend into the stake holes of the side walls of the pickup truck bed. The side and front members of the frame comprise hollow rectangular tubular members, and the side members serve to wholly enclose the retaining members.

The retaining members comprise frames which extend into the holes of the side walls of the pickup truck bed. A cross-shaped member includes a depending arm which is received in an aperture formed in the frame and is positioned thereby. Two laterally extending arms of the cross-shaped member engage camming surfaces of the frame. An upwardly extending arm of the cross-shaped member is positioned within the side member of the frame of the topper and is threaded to receive a nut. The cross-shaped member is first rotated into a laterally extending orientation under the control of the camming surfaces. The nut is then utilized to engage the laterally extending arms with the under surfaces of the top of the side wall of the pickup truck bed to secure the frame of the topper thereto.

In certain embodiments of the invention the cover member of the topper extends beyond the side members of the frame and is provided with sealing members which engage the side walls of the pickup truck bed to seal the interior of the bed. In other embodiments the side edges of the cover member are co-extensive with the side members of the frame of the topper. The latter embodiments may be provided with upwardly extending members secured to the side members of the frame and in turn supporting a ladder receiving structure.

DESCRIPTION OF THE DRAWINGS

A more complete understanding of the invention may be had by reference to the Detailed Description when taken in conjunction with the accompanying Drawings, wherein.

DETAILED DESCRIPTION

Figure 1:
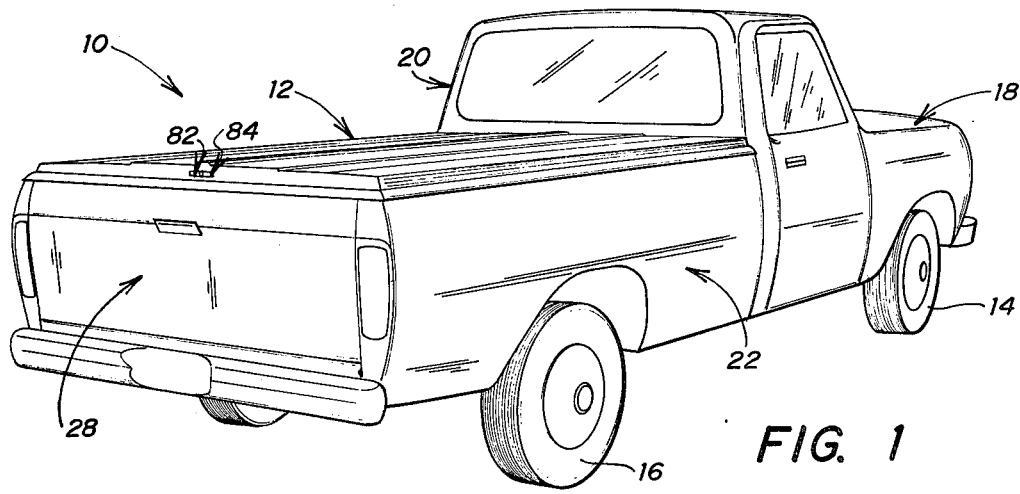
FIG. 1 is a perspective view of a pickup truck equipped with a topper incorporating the present invention.

Referring now to the Drawings, and particularly to FIG. 1 thereof, there is shown a pickup truck 10 equipped with a topper 12 incorporating the present invention. The pickup truck 10 includes a chassis supported on steerable front wheels 14 and rear drive wheels 16. The forward portion of the pickup truck 10 comprises an engine compartment 18. An operator's compartment or cab 20 is situated just rearwardly of the engine compartment 18. The rear portion of the pickup truck 10 comprises a pickup bed 22. The topper 12 of the present invention is utilized as a cover and enclosure for the bed 22 of the pickup truck 10.

Figure 2:
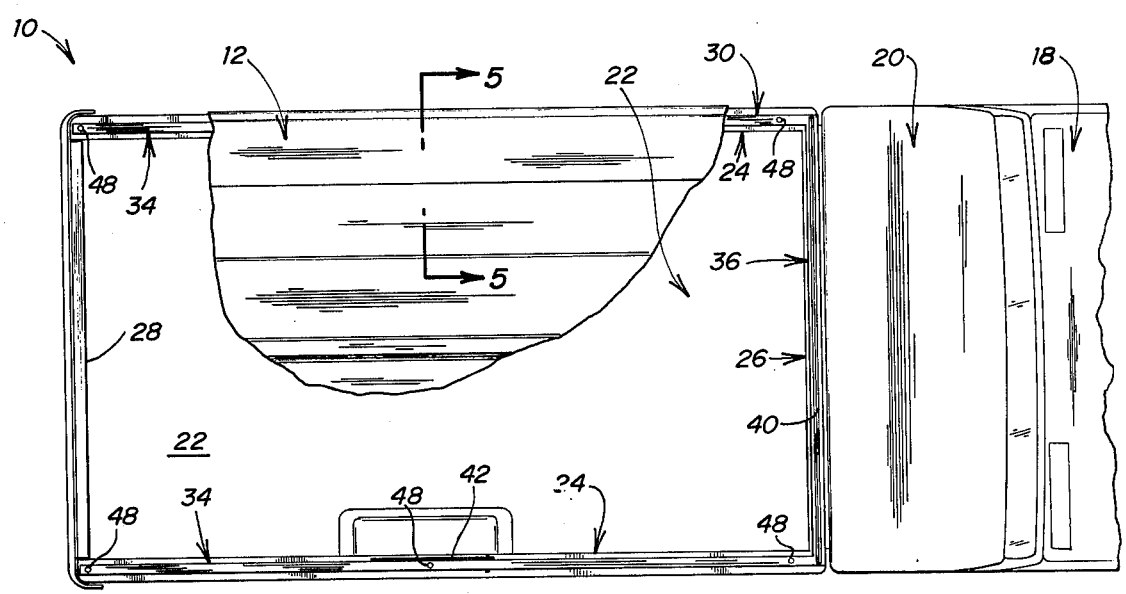
FIG. 2 is a top view of the pickup truck of FIG. 1 in which certain parts have been broken away more clearly to illustrate certain features of the invention.

Referring to FIG. 2 in conjunction with FIG. 1, the pickup bed 22 of the pickup truck 10 comprises opposed side walls 24 and a front wall 26 extending between the front ends of the side walls 24. A tailgate 28 is pivotally supported at the rear of the chassis of the pickup truck 10, and functions to close the rear of the pickup bed 22. A conventional latching apparatus is employed to secure the tailgate 28 between the rear ends of the side walls 24 when the tailgate 28 is in the closed position.

The topper 12 of the present invention includes a U-shaped frame 30 including side members 34 positioned to extend along the tops of the side walls 24 of the pickup bed 22, and a front member 36 positioned to extend along the top of the front wall 26 of the pickup bed. The opposite ends of the front member 36 are preferably joined to the front ends of the side members 34 to form an integral structure. The side members 34 and the front member 36 of the U-shaped frame 30 preferably comprise hollow rectangular tubular members. For example, the component parts of the frame 30 may comprise hollow rectangular tubing sections formed from various metals such as steel, stainless steel, aluminum, magnesium, or the like. Alternatively, the sections defining the frame 30 may be formed from various plastic materials including both thermosetting and thermoplastic materials provided only that the material chosen for the fabrication of the component parts of the frame 30 has at least moderate toughness and strength.

The topper 12 further includes a rigid cover member 38. The cover member 38 extends continuously between the side walls 24 of the pickup bed 22, and between the front wall 26 and the tailgate 28 thereof. In this manner the cover member 38 serves to enclose and secure the contents of the pickup bed 22. The cover member 38 may be formed from one of the various metals which are commercially available in sheet form, but is preferably formed from one of the various plastic sheet materials and therefore comprises a light-weight, high strength cover and enclosure for the pickup bed 22. The cover member 38 is hingedly secured to the front member 36 of the frame 30 by means of a hinge 40. The hinge 40 preferably comprises a piano type hinge and preferably extends continuously along substantially the entire length of the front member 36.

Figure 3:
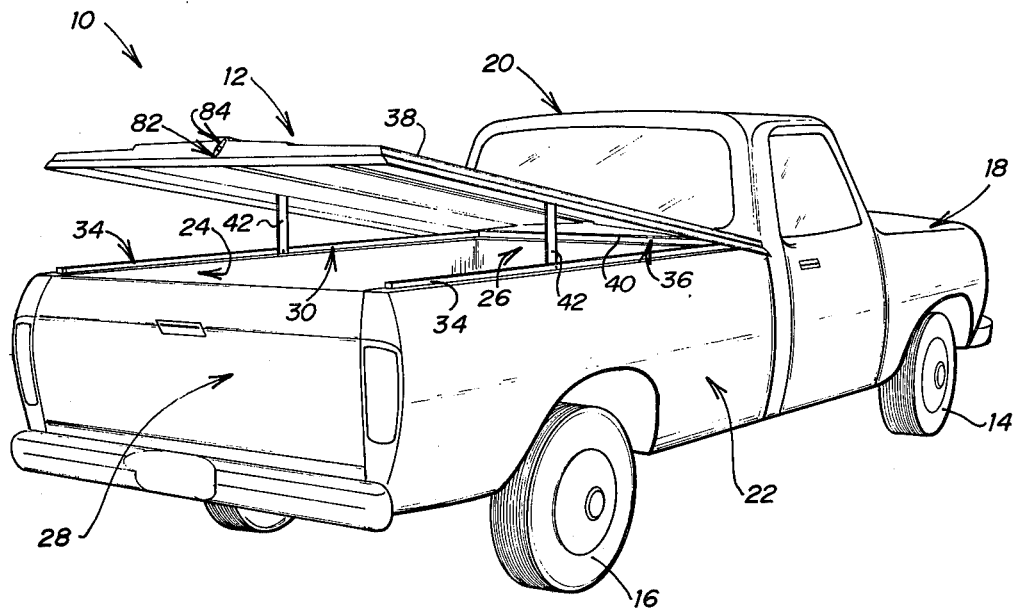
FIG. 3 is a view similar to FIG. 1 showing the topper open.
Figure 4:
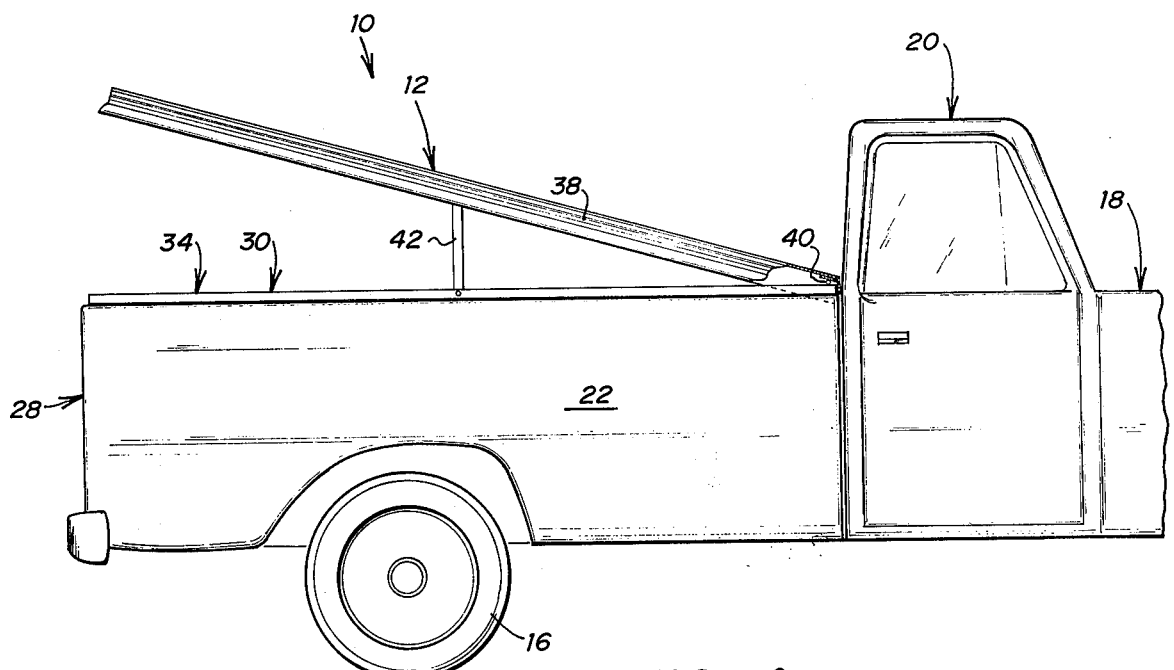
FIG. 4 is a partial side view showing the topper open.

Referring to FIGS. 1, 3, and 4, the hinge 40 supports the cover member 38 for pivotal movement between the closed position shown in FIG. 1 and the open position shown in FIGS. 3 and 4. When the cover member 38 is in the closed position, the bed 22 of the pickup truck 10 is enclosed and secured thereby. When the cover member 38 is in the open position, access is provided to the bed 22. Brace members 42 are provided for supporting the cover member 30 in the open position. The brace members 42 are preferably pivotally supported on the side members 34 of the frame 30.

Figure 5:
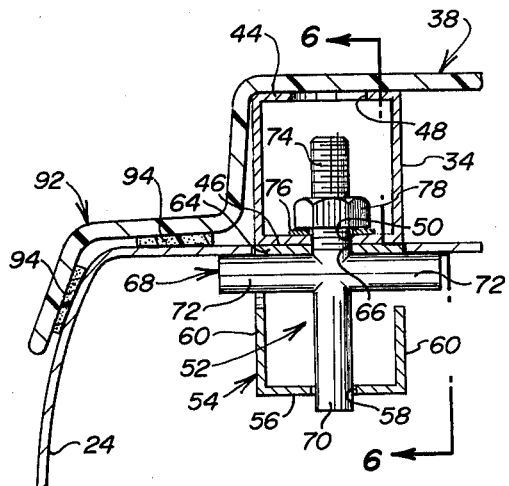
FIG. 5 is a sectional view taken generally along the lines 5—5 of FIG. 2 in the direction of the arrows.
Figure 6:
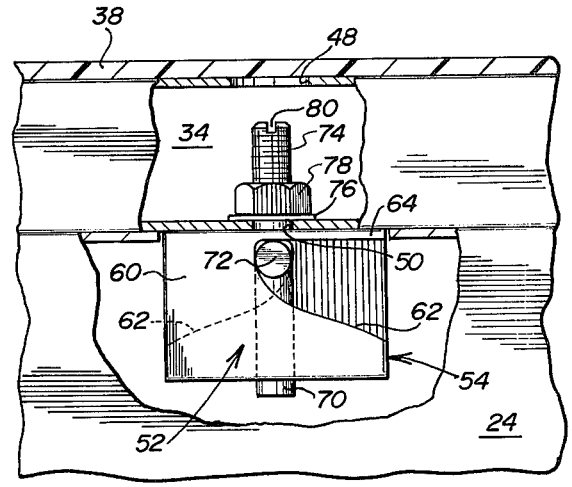
FIG. 6 is a sectional view taken generally along the lines 6—6 in FIG. 5 in the direction of the arrows.

Referring now to FIGS. 5 and 6, the side members 34 and the front members 36 comprising the frame 30 preferably comprise hollow rectangular tubular sections. At least the side members 34 have upper walls 44 and lower walls 46. The upper wall 44 of each side member 34 has a plurality of apertures 48 formed therein, and the lower wall 46 has a plurality of aligned apertures 50 formed therein. The aligned apertures 48 and 50 are formed in each side member 34 at points aligned with the stake holes formed in the side walls 24 of the bed 22 of the pickup truck 10.

An important aspect of the present invention comprises the use of retaining mechanisms 52 of the type shown in FIGS. 5 and 6 to secure the frame 30 and therefore the entire topper 12 to the bed 22 of the pickup truck 10. Each retaining mechanism 52 comprises a frame 54 which is rectangular in cross section, and which has length and width dimensions similar to but slightly smaller than the length and width dimensions of the stake holes. The frame 54 includes a bottom wall 56 having a circular aperture 58 formed therein. A pair of side walls 60 extend upwardly from the bottom wall 56, and each side wall 60 is provided with a camming surface 62. A top wall 64 extends between the upper ends of the side walls 60 and has an aperture 66 formed therein which is aligned with the aperture 58 of the bottom wall 56.

The retaining mechanism 52 further comprises a cross-shaped member 68. The cross-shaped member 68 includes a downwardly extending arm 70 which is received in and positioned by the aperture 58 of the bottom wall 56 of the frame 54. A pair of laterally extending arms 72 each engage the camming surface 62 of one of the side walls 60 of the frame 54. The total length of the laterally extending arms is less than the length dimension of the stake holes but greater than the width dimension thereof. An upwardly extending arm 74 extends through the aperture 66 in the top wall 64 and through the aperture 50 of the side member 34 of the frame 30. The arm 74 is threaded and receives a washer 76 and a nut 78. A slot 80 adapted to receive a screwdriver or similar tool is formed in the upper end of the arm 74. The slot 80 is aligned with the arms 72.

In the use of the retaining mechanism 52, the cross-shaped member 68 is initially positioned with the arms 72 extending as shown in dashed lines in FIG. 6. The frame 54 is dimensioned to be received in the stake holes formed in the side walls 24 of the pickup bed 22. After the frame 54 is positioned in one of the stake holes, a screwdriver or similar tool is inserted through the hole 48 and is employed in conjunction with the slot 80 formed in the arm 74 to rotate the arms 72 into the positions illustrated in full lines in FIG. 6. The proper positioning of the arms 72 is assured by means of the camming surfaces 62 of the side walls 60 and is also visible by means of the slot 80. Thereafter, the nut 78 is tightened to secure the arms 72 in engagement with the under surface of the top of the side wall 24 of the pickup bed 22. By this means the frame 30 and therefore the entire topper 12 is rigidly secured to the pickup bed 22.

It will thus be understood that by means of the retaining mechanisms 52, the topper 12 is readily and easily secured to the pickup bed 22 by means of the stake holes formed in the side walls thereof. By reversing the foregoing procedure, the topper 12 may be removed from the pickup bed 22 with equal facility. It will be further understood that the topper 12 is installed on and secured to the pickup bed 22 without the necessity of forming unsightly fastener receiving holes therein. This in turn eliminates various problems such as rust and corrosion, water entry, etc. which are often encountered when fastener receiving holes are formed in the pickup bed in order to secure a topper thereto.

Figure 7:
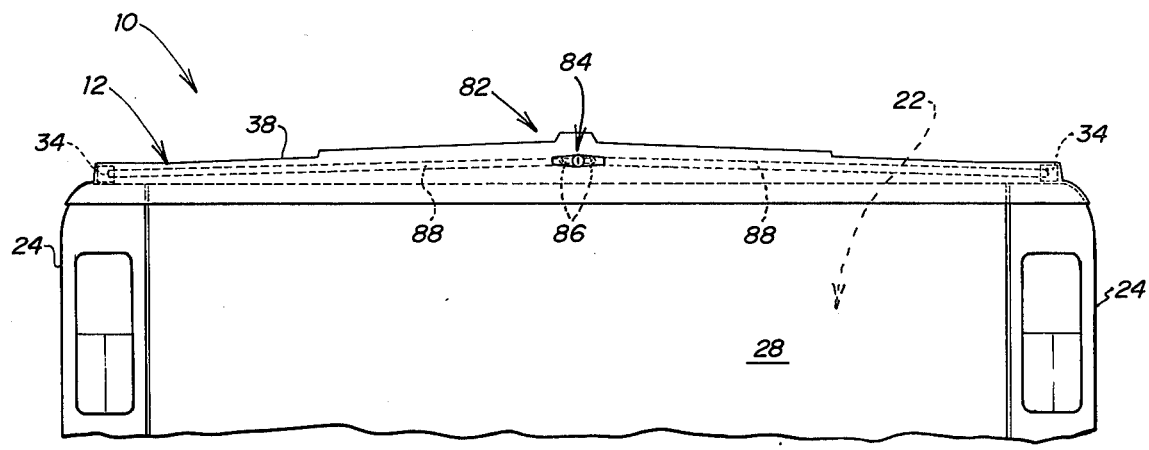
FIG. 7 is a rear view of the pickup truck of FIG. 1 in which certain parts have been broken away.
Figure 8:
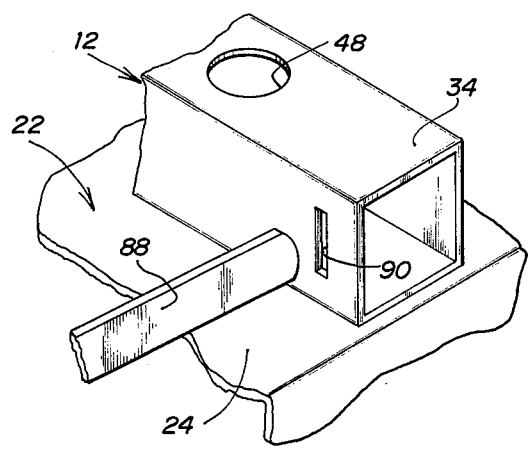
FIG. 8 is a partial perspective view illustrating the latching mechanism of the topper of FIG. 1.

Referring to FIGS. 7 and 8, the cover member 38 of the topper 12 is secured in the closed position by means of a latching mechanism 82. A handle 84 is equipped with a conventional key operated lock. A pair of arms 86 are secured to the handle 84 for rotation therewith. A pair of elongate arms 88 are each pivotally secured to one of the arms 86, whereby upon rotation of the handle 84 the arms 88 are either extended or retracted. Referring particularly to FIG. 8, the side members 34 of the frame 30 are provided with slots 90 adjacent the extreme rear ends thereof. The slots 90 are adapted to receive the distal ends of the arms 88 when the handle 84 is in the position shown in FIGS. 1 and 7. By this means the cover member 38 of the topper 12 is secured in the closed position. Conversely, when the handle 84 is rotated relative to the position shown in FIGS. 1 and 7, the arms 88 are retracted to the position shown in FIG. 8. The cover member 38 may then be pivoted upwardly to the position shown in FIGS. 3 and 4. It will be noted that since the slots 90 are formed in the frame 30, it is not necessary to form similar slots in the side walls of the pickup bed, as is often the case with prior art toppers.

Referring now specifically to FIG. 5, in the embodiment of the invention illustrated in FIGS. 1-8, the cover member 38 of the topper 12 extends laterally substantially beyond the side members 34 of the frame 30. Thus, the cover member 38 includes an outside portion 92 extending across the top of the side wall 24 of the pickup bed 22 and then downwardly along the outside of the side wall 24. Sealing members 94 are mounted on the underside of the cover member 38 and function to further enclose and protect the contents of the pickup bed 22.

Figure 9:
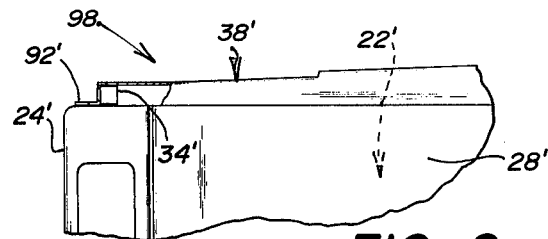
FIG. 9 is a view similar to FIGS. 5 and 7 illustrating a modification of the embodiment of the invention shown in FIGS. 1-8.

In FIG. 9 there is shown a topper 98 forming a second embodiment of the invention which comprises a modification of the embodiment illustrated in FIGS. 1-8. Many of the component parts of the second embodiment of the invention are substantially identical in construction and function to component parts of the embodiment described hereinbefore in conjunction with FIGS. 1-8. Such identical component parts are designated in FIG. 9 with the same reference numerals utilized in the description of the first embodiment, but are differentiated therefrom by means of a prime (') designation.

The topper 98 differs from the first embodiment primarily in the fact that the portion 92' of the cover member 38' does not extend downwardly along the outside of the side wall 24' of the pickup bed 22'. Rather, the portion 92' extends only partially across the top of the side wall 22'. The topper 98 is therefore adapted for use in conjunction with pickup truck models in which the construction of the pickup bed is not readily adapted to receive toppers constructed in accordance with the first embodiment of the invention. Sealing members similar to the sealing members 94 may be utilized in conjunction with the second embodiment of the invention, if desired.

Figure 11:
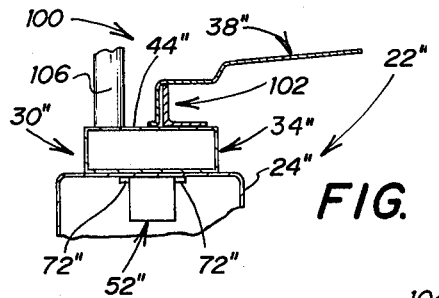
FIG. 11 is a partial sectional view further illustrating the embodiment of FIG. 10.
Figure 10:
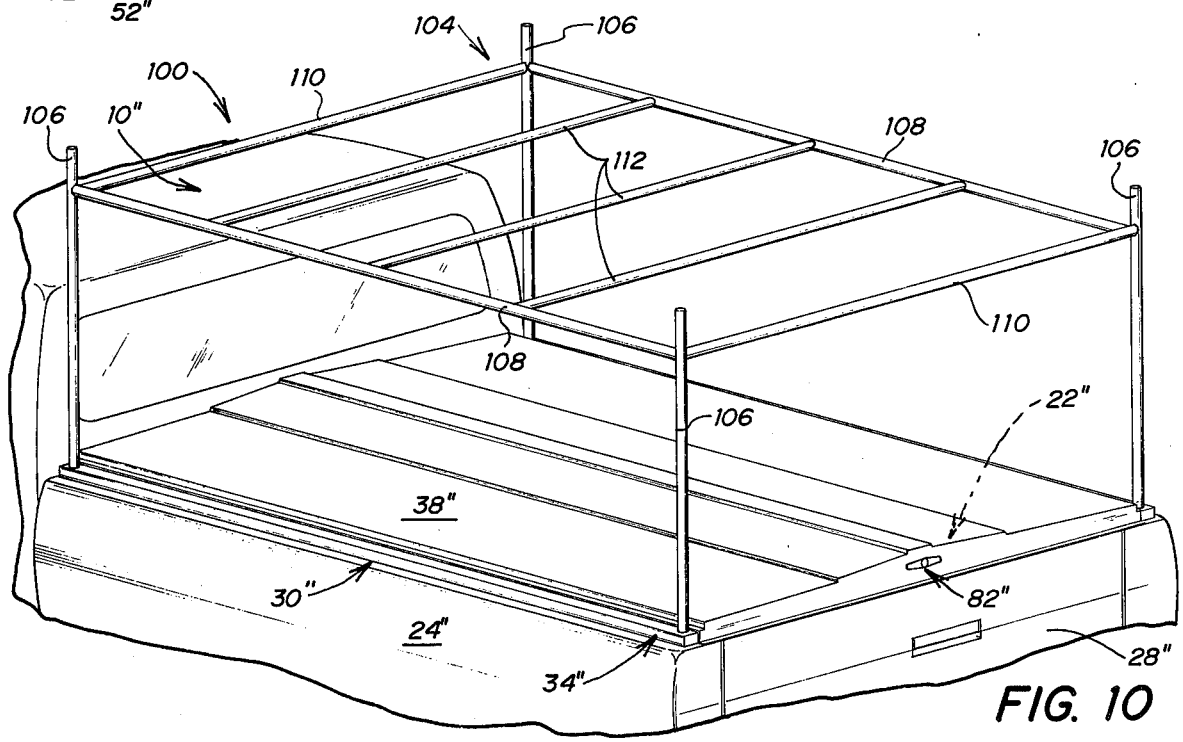
FIG. 10 is a perspective view illustrating another embodiment of the invention.

A topper 100 comprising a third embodiment of the invention is illustrated in FIGS. 10 and 11. Many of the component parts of the topper 100 are substantially identical in construction and function to component parts of the topper 12 illustrated in FIGS. 1-8. Such identical component parts are designated in FIGS. 10 and 11 with the same reference numerals utilized hereinbefore in the description of the topper 12, but are differentiated therefrom by means of a double prime (") designation.

Referring first to FIG. 11, the topper 100 includes a frame 30" comprising side members 34" which are substantially wider than the side members 34 of the topper 12. A length of angle stock 102 is secured to the top wall 44" of the side member 34", and the cover member 38" extends over the length of angle stock 102. Thus, the cover member 38" does not extend beyond the outside edge of the side member 34".

Referring to FIG. 10, a ladder receiving frame 104 is mounted on the frame 30" of the topper 100. The ladder receiving frame 104 comprises four or more vertically extending members 106 each secured to and extending upwardly from the side members 34" of the frame 30". Longitudinally extending members 108 and transversely extending members 110 are secured to the vertically extending members 106, and additional transversely extending members 112 extend between the longitudinally extending members 108.

The topper 100 is particularly advantageous for use by the construction trades and the like. Thus, tools, equipment and supplies may be stored in the bed 22" of the pickup truck 10" and secured therein by means of the locking mechanism 82". Bulky items such as ladders and the like may then be carried on the ladder receiving structure 104. It will be understood that the topper 100 is secured in the stake receiving holes of the side walls of the pickup bed 22" in the manner illustrated in FIGS. 5 and 6, whereby the entire topper 100 may be readily removed from the pickup truck 10", if desired.

From the foregoing, it will be understood that the present invention comprises a topper for pickup truck beds incorporating numerous advantages over the prior art. Perhaps the most important advantage deriving from the use of the invention involves the fact that by means thereof a topper for a pickup truck bed may be secured to the pickup truck utilizing the stake holes of the bed. This is advantageous in that the topper may be readily installed on and subsequently readily removed from the pickup truck bed. Of equal importance is the fact that the topper is installed without the necessity of forming fastener receiving holes and the various problems attendant thereto. Other advantages deriving from the use of the invention will readily suggest themselves to those skilled in the art.

Although preferred embodiments of the invention have been described in the foregoing Detailed Description and illustrated in the accompanying Drawings, it will be understood that the invention is not limited to the embodiments disclosed, but is capable of numerous rearrangements, modifications, and substitutions of parts and elements without departing from the spirit of the invention.

What is claimed is:

1. For use in conjunction with a vehicle of the type having a bed including opposed walls, a front wall and a pivotally supported tailgate and wherein the side walls of the bed have stake holes formed in the tops thereof, a topper assembly comprising:
a U-shaped frame member including side and front members positioned to extend along the tops of the side and front walls of the bed of the vehicle;
retaining means extending into the stake holes for securing said frame member to the side walls of the bed;
said retaining means including:
a rectangular frame dimensioned for insertion into the stake hole of the bed and having a bottom wall, opposed side walls, and a top wall;
an aperture formed in said bottom wall of said frame;

camming surfaces comprising the side walls of said frame;

an aperture formed in said top wall of said frame;

a cross-shaped member including a first arm extending into the aperture of said bottom wall of said frame and positioned thereby, opposed laterally extending arms engaging the camming surfaces of said side walls of said frame, and an upwardly extending arm extending through the aperture in said top wall of said frame; and fastener means engaging the upwardly extending arm of the cross-shaped member for securing said laterally extending arms in engagement with the camming surface of said side walls of said frame;

a cover member extending continuously between side edges spaced apart at least as far as the side walls of the bed and front and rear edges spaced apart at least as far as the front wall and the tailgate of the bed for covering and enclosing the bed of the vehicle; and means securing the cover member to the front member of the frame member for pivotal movement between a first position wherein the cover member covers and encloses the bed and a second position wherein the cover member is supported substantially above the bed to provide access thereto.

2. For use in conjunction with a vehicle of the type having a bed including opposed side walls and a front wall and wherein the side walls of the bed have stake holes formed in the tops thereof, a topper comprising:

frame means including spaced, parallel side members positioned for engagement with the tops of the side walls of the bed of a vehicle and a front member extending between the front ends of said side members and positioned to extend along the top of the front wall of the bed;

retaining means for engagement with the stake holes of the side walls of the bed for securing said frame means thereto;

said retaining means including:

a frame shaped to be received within the stake hole;

a cross-shaped member rotatably mounted within said frame;

said cross-shaped member including a pair of laterally extending arms which are longer than the width of the stake hole and being centrally disposed on said cross-shaped member for rotation from an initial position wherein said laterally extending arms are disposed lengthwise of said frame, thereby enabling said frame to pass into the stake hole, to a position wherein said arms extend transversely relative to the frame to prevent withdrawal of said frame from the stake hole;

said frame including means for locating said laterally extending arms of said cross-shaped member in the transversely disposed position; and means for maintaining said cross-shaped member with said laterally extending arms thereto in the transversely disposed position;

a cover member extending continuously between side edges spaced apart by a distance at least equal to the spacing between said side members of said frame means and between front and rear edges spaced apart by a distance at least equal to the length of said side members of said frame means; and hinge means securing said cover member to said front member of said frame means for pivotal movement between open and closed positions.

3. The retaining mechanism according to claim 2 wherein said frame includes a bottom plate having a locating aperture formed therein, and wherein said cross-shaped member further includes a depending arm extending through the locating aperture of the bottom plate of said frame.

4. The retaining mechanism according to claim 2 wherein said frame comprises side walls, and wherein the means for locating the laterally extending arms of said cross-shaped member in the transversely disposed position comprises camming surfaces formed in said side walls of said frame.

5. The retaining mechanism according to claim 2 wherein said frame comprises a top plate having an opening therein, and wherein said cross-shaped member includes an upwardly extending arm which extends through the opening of the top plate of said frame.

6. The retaining mechanism according to claim 5 wherein said upwardly extending arm of said cross-shaped member is threaded, and wherein the means for maintaining the laterally extending arms of the corss-shaped member in the transversely disposed position comprises threaded fastener means threadedly engaging said upwardly extending arm of said cross-shaped member.

7. The retaining mechanism according to claim 6 wherein said upwardly extending arm of said cross-shaped member further comprises means for effecting rotation of the corss-shaped member relative to the frame and for indicating the rotational position of the cross-shaped member relative to the frame.

8. For use in conjunction with a vehicle of the type having a bed including opposed side walls and a front wall having top surfaces and a pivotally supported tailgate, a topper comprising:

frame means including side members and a front member;

said side members having front and rear ends, parallel side walls and upper and lower walls to define an open space within said side members, said lower walls of said side members positioned to extend along and engage a portion of the top surface of the side walls of the bed of the vehicle in the vicinity of the tailgate and the front wall of the bed of the vehicle;

retaining means disposed within said open space between said parallel sides, upper and lower walls of said side members for engagement with the side walls of the bed of the vehicle;

a cover member extending continuously between side edges spaced apart to extend beyond said upper walls of said side members to thereby cover said retaining means disposed within said side members and extending continuously between front and rear edges spaced apart to extend from the front wall of the bed of the vehicle to a position over the tailgate of the bed of the vehicle to completely cover and enclose the bed of the vehicle for preventing access thereto and for preventing the opening of the tailgate;

means securing said cover member to said front member for pivotal movement between a first position wherein said cover member is supported substantially above the bed of the vehicle to provide access thereto and a second position wherein said cover member completely covers and encloses the bed and tailgate of the vehicle for preventing access thereto;

said side edges of said cover member further including sealing means for engaging the exterior of the side walls of the bed of the vehicle at points located beyond said side members; and latching means mounted on said cover member for selective engagement with said side members in the vicinity of the tailgate to secure said cover member to said side members in said second position.

9. The topper according to claim 8 wherein said means securing said cover member to said front member comprises piano hinge means secured to said front member and said front edge of said cover member and extending substantially the entire length of said front edge of said cover member.

* * * * *